United States Patent [19]
Green

[11] Patent Number: 5,377,374
[45] Date of Patent: * Jan. 3, 1995

[54] TURF AND GARDEN TOOL

[76] Inventor: William J. Green, 3821 Barbara Way, Salt Lake City, Utah 84124

[*] Notice: The portion of the term of this patent subsequent to Feb. 23, 2010 has been disclaimed.

[21] Appl. No.: 130,793

[22] Filed: Oct. 4, 1993

[51] Int. Cl.6 ................................................ A01B 1/00
[52] U.S. Cl. .......................................... 7/114; 7/116; 254/132
[58] Field of Search ..................... 7/114–116; 254/132

[56] References Cited

U.S. PATENT DOCUMENTS

| | | | |
|---|---|---|---|
| 779,562 | 1/1905 | Ransom | 7/116 X |
| 3,404,412 | 10/1968 | Ryan | 7/116 |
| 3,545,855 | 12/1970 | Mendenhall | 7/114 X |
| 5,188,340 | 2/1993 | Green | 254/132 |

Primary Examiner—James G. Smith
Attorney, Agent, or Firm—M. Ralph Shaffer

[57] ABSTRACT

A turf and garden tool implement useful in extracting weeds as well as severing the branches of small plants, bushes, small trees and the like; the tool includes an elongate rod member provided with a handle and a foot step, with the lower portion of the rod member being supplied a tool, generally referred to as a root trap tool, which is curved and hemi-conical in configuration, the leading edge being provided with serrations for suitable cutting purposes, and the upper edge of the tool being arcuate, upwardly angulated in a curvilinear manner, and is provided with a sharpened edge margin for effecting branch removal.

3 Claims, 3 Drawing Sheets

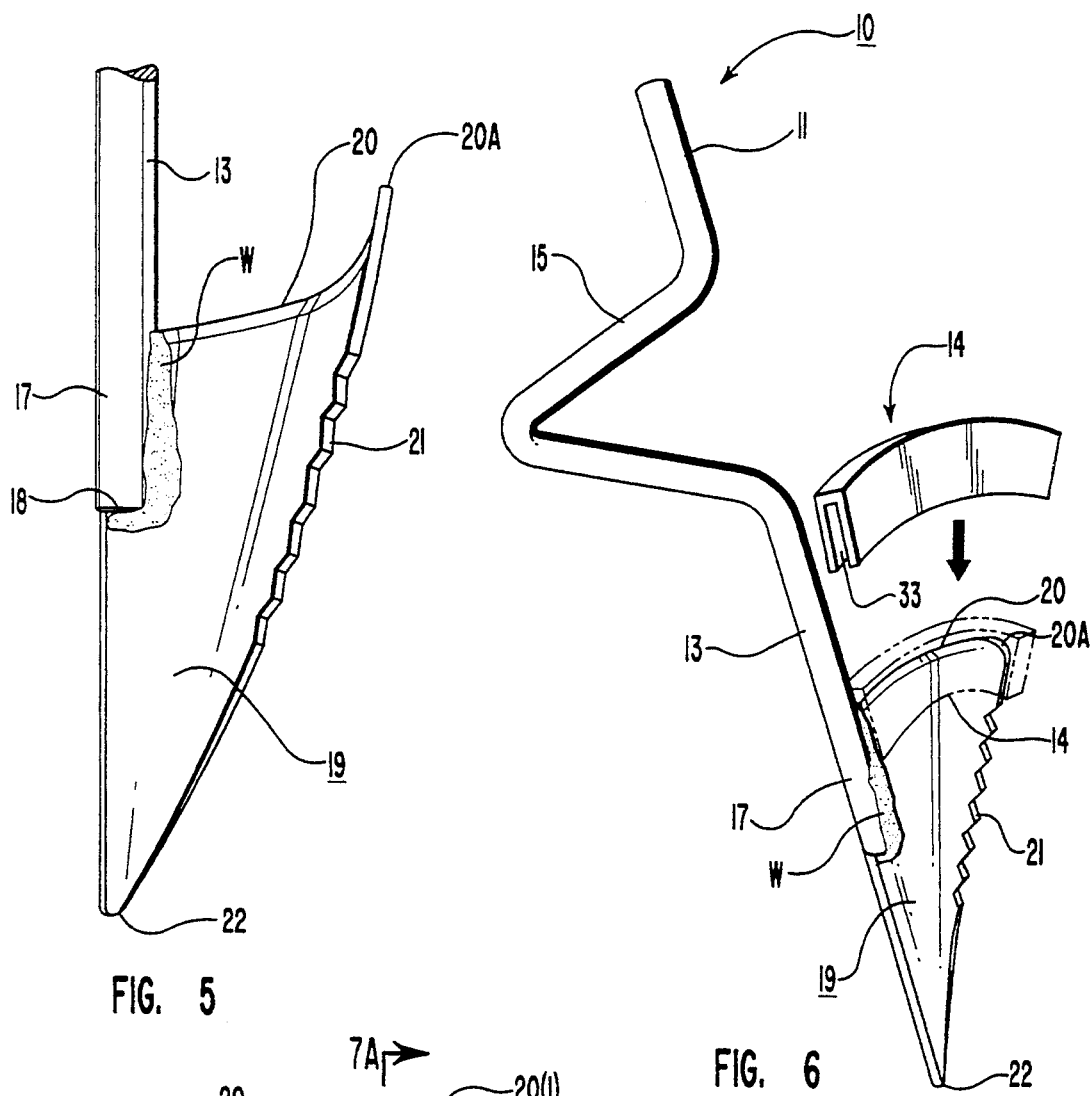
FIG. 5
FIG. 6
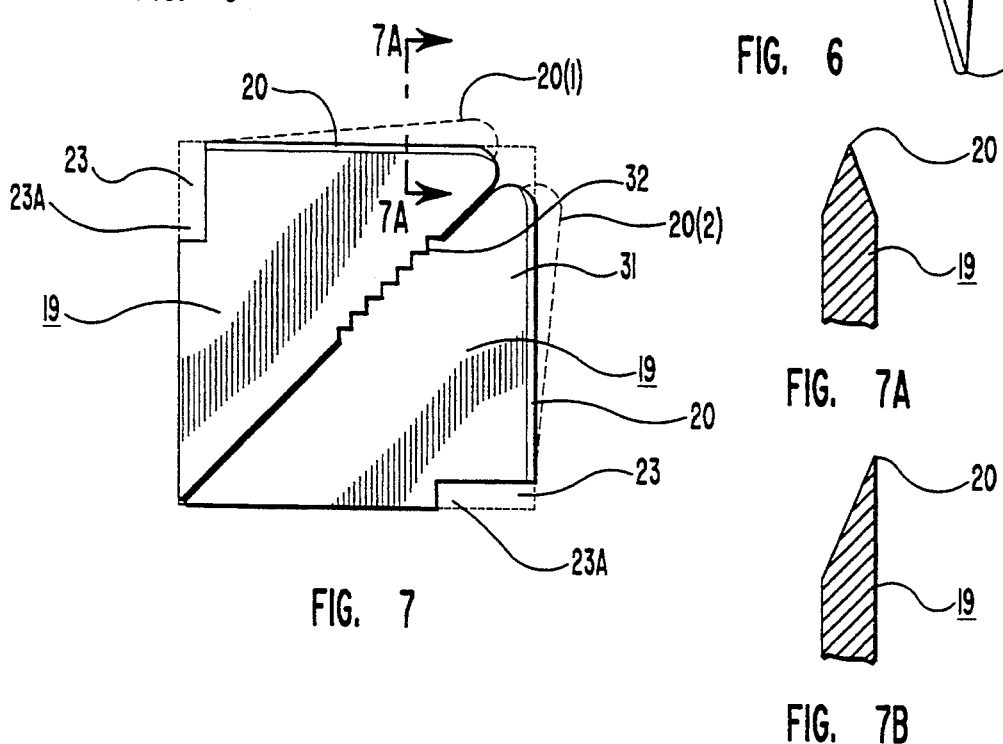
FIG. 7
FIG. 7A
FIG. 7B

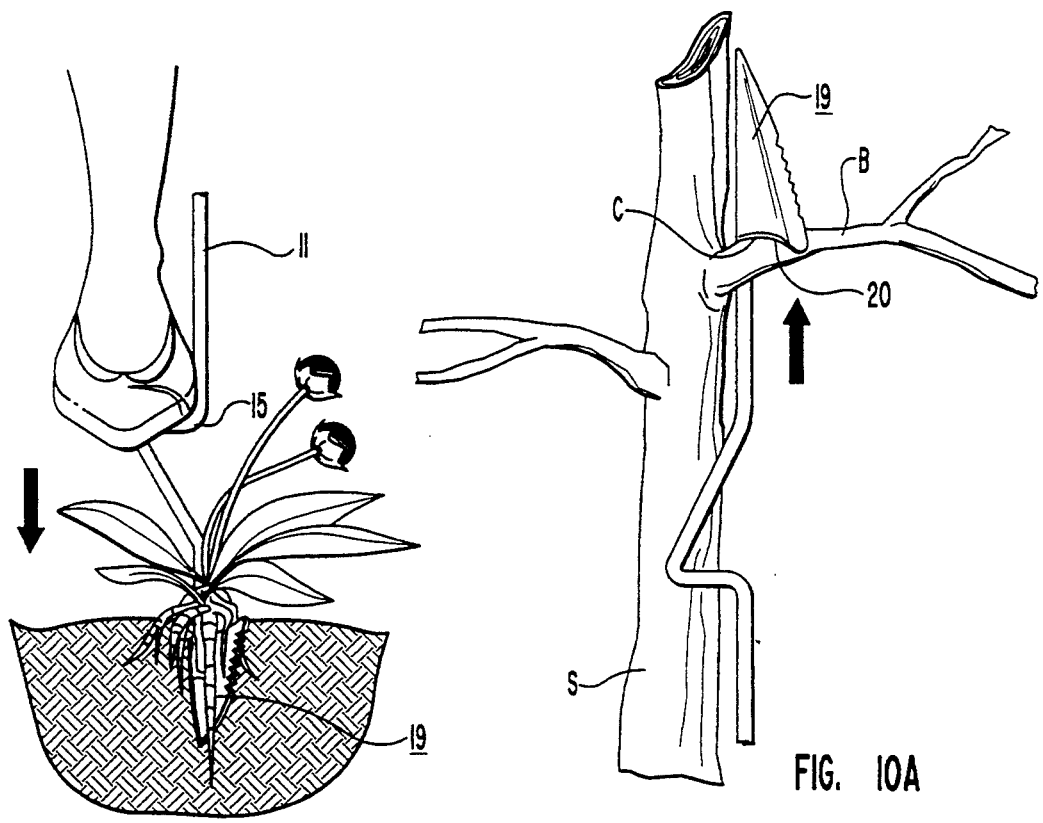
FIG. 8
FIG. 10A
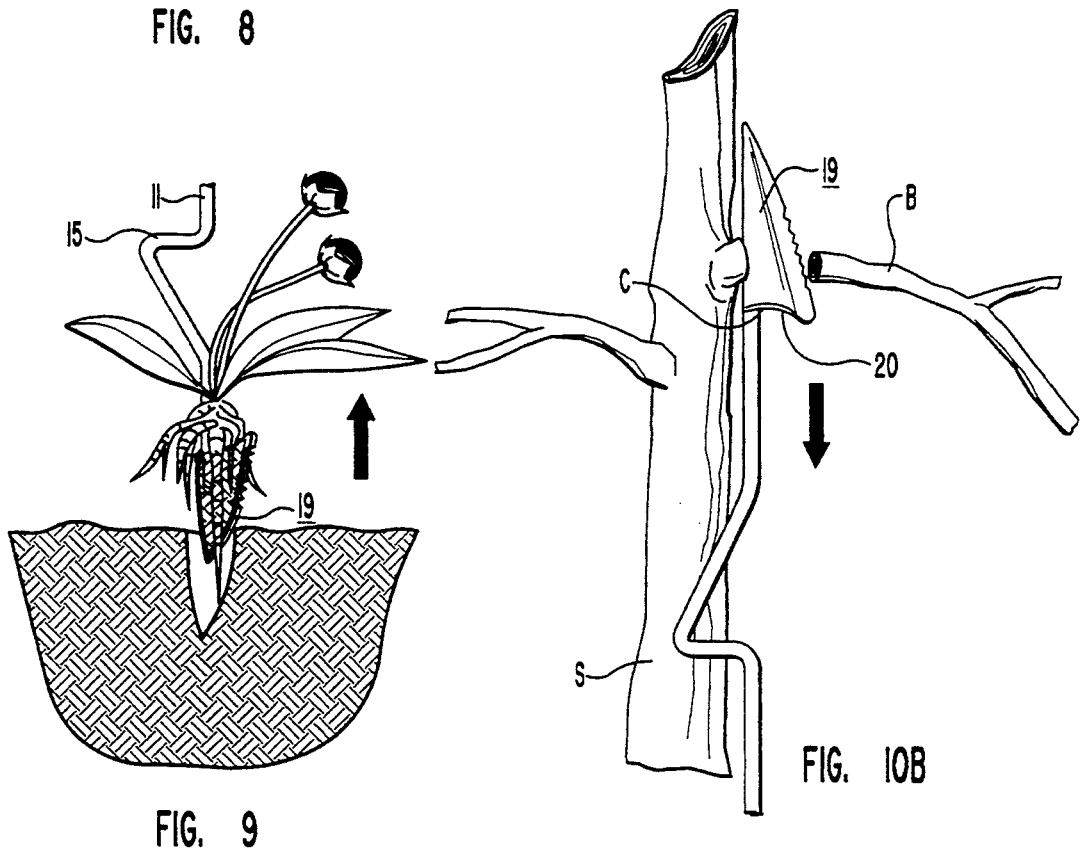
FIG. 9
FIG. 10B

TURF AND GARDEN TOOL

FIELD OF INVENTION

The present invention relates to garden tools for turf, gardens and general horticultural use and, more particularly, provides a turf and garden tool wherein the same may be employed not only to extract weeds from turf, lawn and other areas, but it is provided with a curved and sharpened edge useful for severing the branches of small bushes, plants, trees and so forth.

BRIEF DESCRIPTION OF PRIOR ART

The only art currently known and directly applicable to the subject invention is the inventor's own prior patent entitled Weed Extraction Devise, U.S. Pat. No. 5,188,340, issued Feb. 23, 1993. A generally related patent, related to the general field of the invention but not applicable to the specific invention herein described and claimed, is the U.S. Hardman patent, U.S. Pat. No. 2,349,621, issued in May of 1944. The inventor's prior patent, U.S. Pat. No. 5,188,340, is fully incorporated herein by way of reference. A general description of the prior art is given in the inventor's patent and need not be repeated. The present invention is an improvement over the inventor's patent in the provision of an upper arcuate sharpened edge which is useful for severing the branches of bushes, such as rose bushes, other plants, small trees and the like. The elongate rod member is likewise fixed to the working tool, relative to weed removal, in a manner such as to increase the throat of such tool.

BRIEF DESCRIPTION OF INVENTION

In the present invention, the subject turf and garden tool includes a generally vertical rod member provided with an upper handle, a medial footstep, and a lower root trap tool. The root trap tool is affixed to the lower extremity of the rod member in such a configuration and manner that the throat of the hemi-conically formed tool is maximized. Furthermore, the upper arcuate edge of the tool has a sharpened edge suitable for severing various items in the garden such as branches and suckers of small trees, rose bushes, other small plants, and so forth. Accordingly, the structure has been designed for plural uses, one of which is to place the sharpened tool over a particular branch to be severed from a small tree, bush and so forth. A simple jerk of the tool will cause the sharpened edge to penetrate the branch and to sever it from the stock of the plant in question. Preferably, the throat of the root trap tool will be sufficiently enlarged such that a substantial portion thereof will encompass to a measured arc the stem of the plant from which the branch or sucker growth is to be severed. Such a sharpened edge can be provided with a removable cover, for safety purposes.

As to a second use, the tool is likewise suitable for ground or turf penetration, by the user pressing upon the footstep supplied, so that the root trap tool proceeds downwardly about a plant to be removed, such as a dandelion plant. The upper edge is arcuately curved so that it can proceed above the turf, generally, yet supply a forward leading edge for the general cutting and severing portion of the root trap tool.

The upwardly angulated arcuate sharpened edge of the root trap tool serves not only the purpose set forth in the previous paragraph, but likewise provides, in effect, a cradle for any specific branch to be severed, so that the branch will not slip out of engagement with the tool while the same is being positioned in place for operation and urged downwardly, as the case may be, for operative action.

OBJECTS

Accordingly, an object of the present invention is to provide a new and improved turf and garden tool.

A further object is to supply a turf and garden tool of the type described wherein the same incorporates a root trap tool the upper edge of which is arcuate upwardly inclined and sharpened, this to provide a cutting edge for the branches and sucker growths of bushes, trees, small plants and the like, and this in a manner such that the branch will be retained proximate the apex of the upper edge in its juncture with the rod of the tool so that the branch will not inadvertently slip out of engagement.

An additional object is to provide an attachment construction relative to the rod member and the root trap tool employed, this so that there is a smooth outer surface relative to the rotational action of the root trap tool and, in addition, so that the throat of the tool proximate its conical interior is maximized to receive a number of types of plant roots, branch limbs, and so forth.

IN THE DRAWINGS

The features; of the present invention may best be understood by reference to the following detailed description, taken in connection with the accompanying drawings, in which:

FIG. 5 is an enlarged detail of the composite tool, is similar to FIG. 2, and illustrates the welding of the lower rod extremity to the root trap tool at the recess provided in such tool.

FIG. 6 is similar to FIG. 5, but illustrates that a protective cover can be employed to cover the upper sharpened edge of the root trap tool when such edge is not being employed for severing purposes, as hereinafter explained in detail.

FIG. 7 is a flat-pattern layout of a metal blank employed in a stamping and cutting operation, whereby to provide a pair of root trap tool blanks which can be simultaneously or subsequently hemi-conically formed to proving a pair of root trap tools, ready for attachment to handle-rods.

FIG. 7A is an enlarged section detail of the sharpened edge of the root trap tool wherein the edge takes a chisel shape.

FIG. 7B is similar to FIG. 7A but illustrates the sharpened edge to be formed by a single sloping or chamfered side.

FIG. 8 is a front elevation of the tool of FIG. 1 wherein the same is pressed downwardly by use of the operator's foot into the turf and subsequently rotationally displaced essentially about the axis of the rod-handle so as to produce an essentially conically formed turf section containing the weed to be extracted from the turf.

FIG. 9 is similar to FIG. 8 but illustrates an upward movement of the tool whereby the root trap tool lifts upwardly upon the weed section the roots of which have been previously severed or are simply withdrawn as per the operation shown in FIG. 8.

FIG. 10A is a front elevation of a plant having a branch being severed from the stock or stem of the plant, the tool being disposed proximate to and/or encompassing the stem so that the sharpened edge engages the branch preparatory to the actuation of the tool for severing such branch.

FIG. 10B illustrates the severing condition relative to the structure seen in FIG. 10A.

DETAILED DESCRIPTION OF PREFERRED EMBODIMENTS

Figure 1:
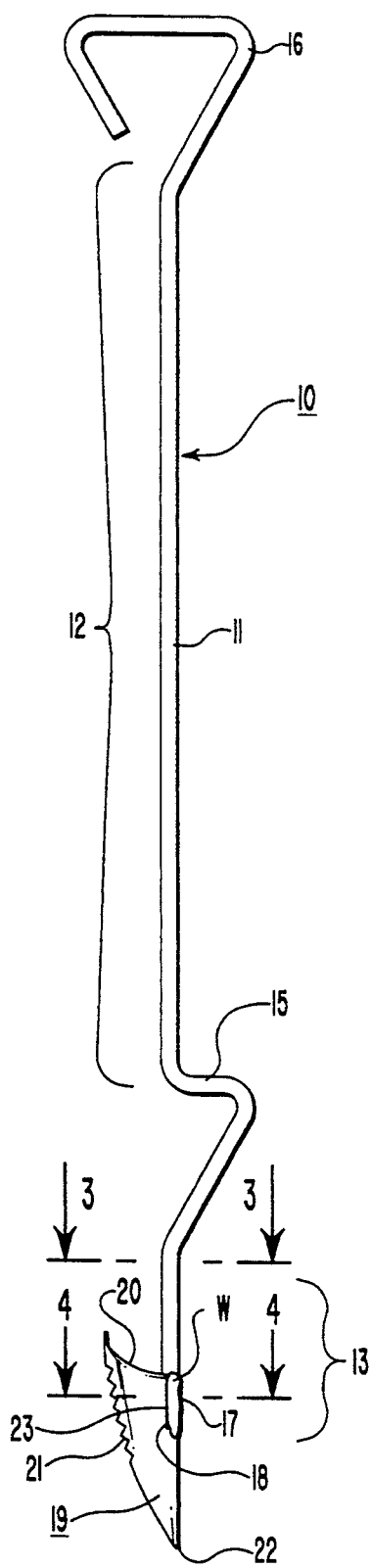
FIG. 1 is a side elevation of a turf and garden tool constructed in accordance with the principles of one embodiment of the invention.

In FIGS. 1–6 tool 10 includes a rod member 11 having upper rod portion 12 and also lower rod portion 13. Intermediate to the upper and lower rod portions is a footstep 15 which is integrally formed therewith as shown. The upper extremity of upper rod portion 12 is provided with a handle 16, configured essentially as indicated. The lower rod portion 13 includes an extremity 17 which is welded, in one embodiment of the invention, in an extremity receiving recess 18 to root trap tool 19. Root trap tool 19 comprises a hemi-conical sector having a sharpened upper edge 20 terminating in an edge extremity 20A and a developed arcuate serrated side edge 21 terminating at a sharpened point 22. The root trap tool 19 is secured at its edge 23 to a side of the depending lower rod portion 13 and is welded in place at W. Where equivalent opposite-side portions of the lower rod portion 13 are disposed on opposite sides of that edge 23 of the tool, see FIG. 4, then a minimum of space is taken up proximate the arcuate interior of the tool, and welding can be effected at both sides proximate edge 23, see FIG. 2, as well as at the lower tip or extremity 17 of lower rod portion 13.

Figure 4:
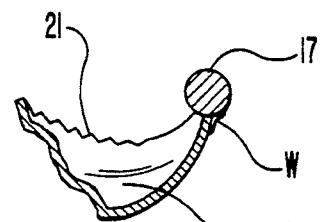
FIG. 4 is a transverse horizontal section looking down, is taken along the line 4—4 in FIG. 1, and illustrates one approach to attaching the lower rod extremity of the composite tool to the root trap tool.
Figure 4A:
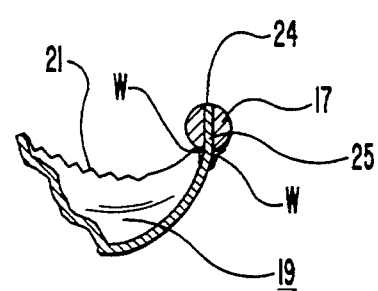
FIG. 4A is similar to FIG. 4, but illustrates an alternate approach to attaching the lower rod extremity of the composite tool to the lower root trap tool.

An alternate configuration is seen in FIG. 4A wherein the lower rod portion 13 at extremity 17 includes a slot 24 receiving the edge 25 of a root trap tool wherein the indentation at 23 is not provided. Again, in FIG. 4A, the root trap tool 19 can be conveniently welded to the lower rod portion extremity 17 at the slot 24.

FIG. 7 illustrates a sheet 31 which is designed and dimensioned to provide a pair of root trap tools 19 having a cut score at 32 which is saw-toothed in configuration to provide the serrated edges of respective ones of the root trap tool 19 as seen in FIG. 1, by way of example. Where the indentations at 23 forming recesses 18 are to be provided, then the same can be simply stamped out at indentation areas 23, and then simply removing the fragmentary pieces 23A. Subsequent to the stamping operation which will also provide the cut score at 32, the two root trap tools 19 are die-formed to conically-shaped configurement as seen, then these, having been separated, can be employed for two independent composite tools. Of course, subsequent to the cutting, each portion at 19 in FIG. 7, and as previously alluded to, is formed as respective hemi-conical sectors such that the configuration as seen in the remaining drawings is achieved. Where the cutting edges 20 are to be inclined, as seen in FIG. 10A, then the metal blank in FIG. 7 will have sloping edges as shown at the dotted lines at 20(1) and 20(2).

Figure 2:
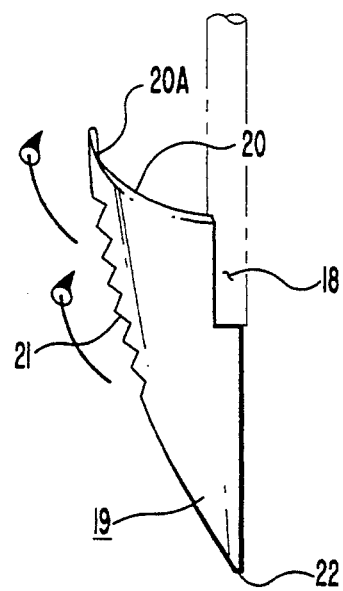
FIG. 2 is an enlarged detail of the lower portion of the structure of FIG. 1, illustration the recess into which the lower extremity of the depending rod fits therein to be welded or otherwise secured to the root trap tool incorporated in the construction.
Figure 3:
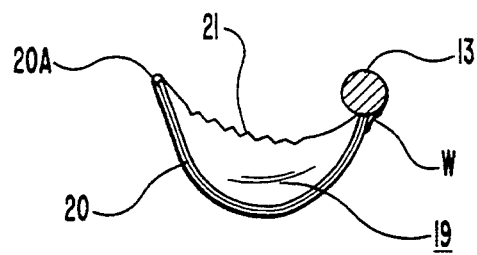
FIG. 3 is a transverse horizontal section looking down, and is taken along the line 3—3 in FIG. 1.

In FIG. 8, the operation of the tool is shown wherein the tool is thrust downwardly into the earth and then rotated or axially twisted in the direction of the arrows in FIG. 2 so as to cut conically a portion of the sod about the weed to be retrieved. Then, as seen in FIG. 9, when the tool is rotated and pulled upwardly toward the chest of the user, the weed and its conical sod section are removed from the turf.

Of importance in the invention is the inclusion of an upper edge 20 which is sharpened to a sharp severing edge as seen at 20, seen in FIGS. 7A and 7B to be either of chisel shape or simply sloped or chamfered on one side only. See also FIG. 2. Further, the sharpened edge 20 forms an independent though quite important function for the tool when the same is used to severe small branches of a plant as seen in FIGS. 10A, 10B. Accordingly, when the tool is used for such purposes, the same is simply inverted and the tool generally embraces the stock of the plant such that the user can simply pull downwardly to severe sucker or branch B from stock S. The tool can be inverted or used sideways to effect similar types of severing relative to the material to be removed. A rubber or plastic removable cover 14, seen in FIG. 6, and having a channel-shaped transverse cross-section at 33 can be employed for removable securement in a friction fit over the sharpened edge 20, for safety purposes, and then removed and placed in one's pocket when the severing action is about to take place.

It is seen that the tool is useful for both right-handed and left-handed users, and either the right foot or the left foot can be employed to push downwardly the footstep 15 of rod member 11 so that the root trap tool penetrates the sod. The proportions of the various parts are not to be understood as being delimiting herein. Rather, a variety of modifications, dimensional and otherwise, can be effected to provide a suitable weed removal tool. The essential point is that the rod member 11 be provided a handle, a foot step, and be attached to a root trap tool that is curved and proceeds to a sod penetrating point, and be formed essentially in conical fashion.

It is noted that preferably the edge 20A having the sharpened edge 20, see FIG. 1, can be oriented upwardly at an incline relative to the point of attachment with lower rod portion 17, whereby to form a cradle C, see FIG. 10A. In such case, the edges of the blank material as seen in FIG. 7 will be angularly extended to the respective dotted line configurations shown at 20(1) and 20(2). Again, this is to minimize possible slippage of the tool relative to branch B and stock S in FIG. 10. Accordingly, the descending nature of that portion of the sharpened edge 20 nearest the lower rod portion 13, the greater the cradling effect so that a severing action can be easily accomplished.

While the particular embodiments have been shown and described, it will be obvious to those skilled in the art that various changes may be made from the invention shown with particularity herein and, therefore, the aim in the appended claims is to cover all such changes and modifications that fall within the true spirit and scope of the invention as set forth above.

I claim:

1. A multi-use turf and garden tool including, in combination, a rod member comprising an upper handle, an upper rod portion integral with and depending from said upper handle, a lower rod portion extending beneath said upper rod portion and having a lower extremity, a medial, laterally-extending step portion integral with said upper and lower rod portions, and an arcuately curved root trap tool formed essentially as a hemi-conical sector and having a lower turf-penetration end and an attachment side fixed to said lower rod portion at said lower extremity, said root trap tool having a side, serrated, sloping leading edge for sod cutting about a weed location and also an upper, arcuate, sharpened cutting edge means formed in part by at least one chamfered side for selectively severing off-shoots of plant-life.

2. A multi-use turf and garden tool including, in combination, a rod member comprising an upper handle, an upper rod portion integral with and depending from said upper handle, a lower rod portion extending beneath said upper rod portion and having a lower extremity, a medial, laterally-extending step portion integral with said upper and lower rod portions, an arcuately curved root trap tool formed essentially as a hemi-conical sector and having a lower turf-penetration end and an attachment side fixed to said lower rod portion at said lower extremity, said root trap tool having a side, serrated, sloping leading edge for sod cutting about a weed location and also an upper, arcuate, sharpened cutting edge means for selectively severing off-shoots of plant-life, and a curved protective cover having an inverted-channel-shaped transverse cross-section releasably secured to said root trap tool over said sharpened cutting edge means, for protecting against injury during intervals when said sharpened edge means is not intended for immediate use.

3. A multi-use turf and garden tool including, in combination, a rod member comprising an upper handle, an upper rod portion integral with and depending from said upper handle, a lower rod portion extending beneath said upper rod portion and having a lower extremity, a medial, laterally-extending step portion integral with said upper and lower rod portions, and an arcuately curved root trap tool formed essentially as a hemi-conical sector and having a lower turf-penetration end and an attachment side fixed to said lower rod portion at said lower extremity, said root trap tool having a side, serrated, sloping leading edge for sod cutting about a weed location and also an upper, arcuate, inclined, sharpened cutting edge means for selectively severing off-shoots of plant-life as is caused to be cradled proximate the juncture of said rood trap tool at said cutting edge means and said lower rod portion, said root trap tool having a notch recess fixedly receiving said lower extremity of said lower rod portion, and a curved protective cover having an inverted-channel-shaped transverse cross section releasably secured to said root trap tool over said sharpened cutting edge means, for protecting against injury during intervals when said sharpened edge means is not intended for immediate use.

* * * * *